(12) United States Patent
Khan et al.

(10) Patent No.: US 6,407,889 B1
(45) Date of Patent: *Jun. 18, 2002

(54) SUSPENSION WITH READILY MANUFACTURABLE VERTICALLY AND LATERALLY OFFSET LIFTER

(75) Inventors: Amanullah Khan; Gustavo Nuno, both of Temecula, CA (US)

(73) Assignee: Magnecomp Corp., Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/697,986

(22) Filed: Oct. 26, 2000

Related U.S. Application Data

(63) Continuation of application No. 09/276,351, filed on Mar. 25, 1999, now Pat. No. 6,144,532.

(51) Int. Cl.⁷ .................................................. G11B 5/54
(52) U.S. Cl. ....................................................... 360/255
(58) Field of Search .............................. 360/255, 254.6, 360/255.5, 255.9

(56) References Cited

U.S. PATENT DOCUMENTS

| | | | | |
|---|---|---|---|---|
| 5,644,451 A | * | 7/1997 | Chan et al. ................. | 360/105 |
| 5,864,448 A | * | 1/1999 | Berberich ................... | 360/105 |
| 6,144,532 A | * | 11/2000 | Khan et al. ................. | 360/255 |

* cited by examiner

*Primary Examiner*—Robert S. Tupper
(74) *Attorney, Agent, or Firm*—Louis J. Bachand

(57) ABSTRACT

An easily manufacturable disk drive suspension load beam lifter comprises a lift arm shifted laterally and vertically and cantilevered from the load beam by a web extending at an angle and for a distance from the load beam that is adjustable to provide a predetermined height and position for the lift arm above the disk.

17 Claims, 3 Drawing Sheets

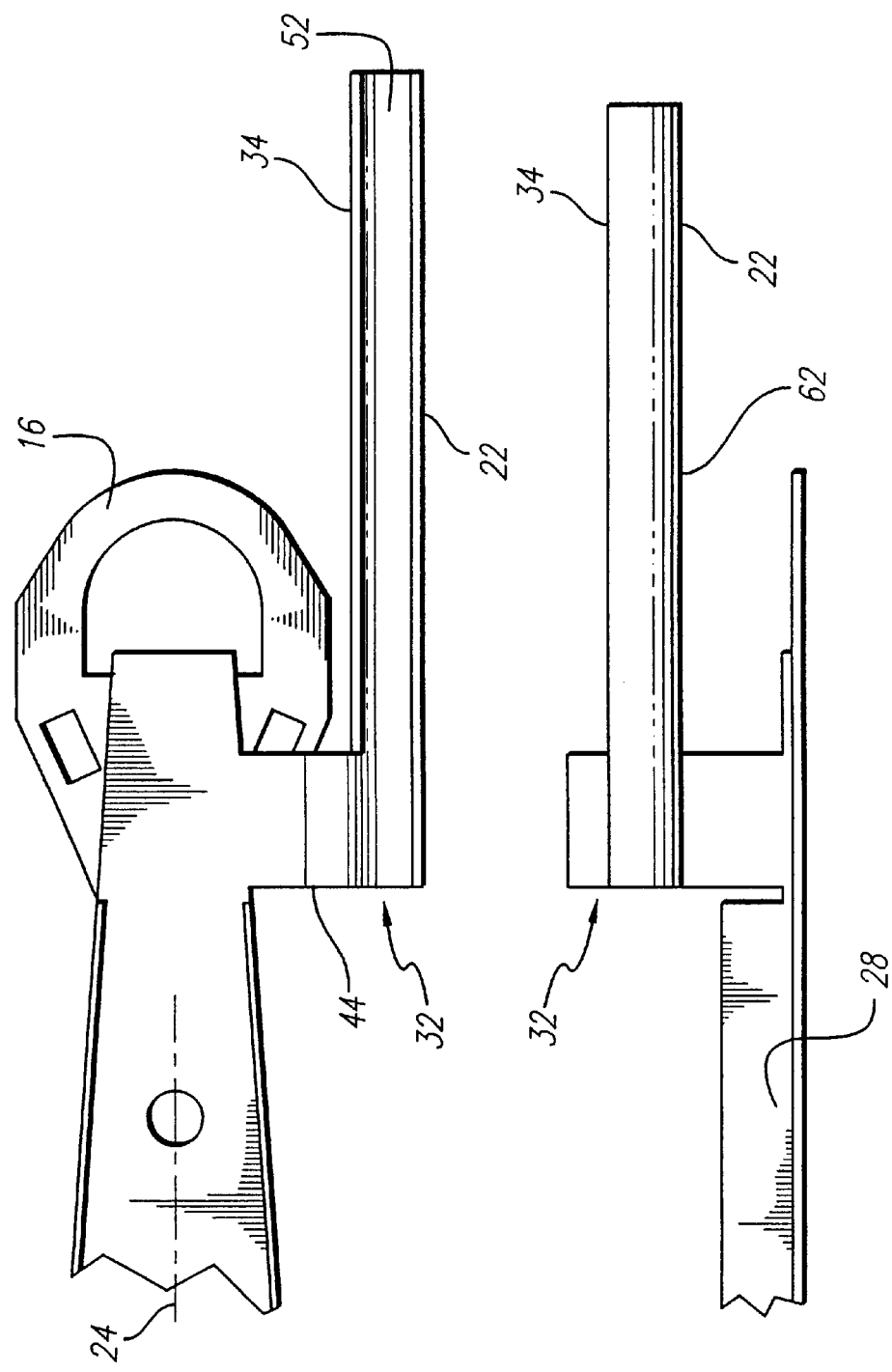

SUSPENSION WITH READILY MANUFACTURABLE VERTICALLY AND LATERALLY OFFSET LIFTER

REFERENCE TO RELATED APPLICATION

This application is a continuation of our application Ser. No. 09/276,351, filed Mar. 25, 1999, now U.S. Pat. No. 6,144,532.

BACKGROUND OF THE INVENTION

1. Field of the Invention

This invention relates to disk drive suspensions and, more particularly, to a new design of lifter for the load beam in a disk drive suspension. The lifter is mounted to the load beam rigid portion near the distal end of the load beam. As mounted, the lifter is laterally offset, i.e. offtrack from the load beam centerline, and also vertically offset from the plane of the load beam rigid portion. The invention lifter thus provides a high clearance from the disk for insertion of the camming ramp and a locus of ramp contact with the lifter that is nearer to the disk edge. Moreover, the present lifter is of simple shape readily formed by conventional manufacturing processes.

2. Related Art

A lifter is a part of the suspension mechanism that works with the camming surface of a load ramp to load and unload the slider carried by a flexure-load beam combination from the rotating disk.

In removable disk drives mechanisms are provided to lift the suspensions including a ramp and a cam follower to enable retrieval of the disk (media) without the slider contacting the disk. When the slider is lifted-off the disk, it does not read or write to the disk. Improved disk technology has made disks smoother to avoid stiction problems. Typical lifters used in present drives are hypodermic needle-sized tubes that are glued to the load beam, or attached thereto by crimping tabs or other metal folding structure. These lifters are located either along the centerline of the suspensions or off the centerline of the suspensions. To prevent unwanted read-write activity of the slider, the slider is desirably lifted off the disk as far as possible at the outer diameter of the disk and this is problematical with a centerline-mounted lifter. See FIG. 5 PRIOR ART. A further problem with centerline lifters is the difficulty of lifting the slider by a ramp when the lifter is at the centerline of the long axis of the suspension. There is very little clearance between the disk and the ramp surface. An off-center, or off-track lifter avoids these centerline lifter problems by allowing the suspension to be lifted off relatively closer to the outer diameter of the disk.

SUMMARY OF THE INVENTION

It is accordingly an object of the invention to provide a load beam having a lifter structure comprising a lift arm offset vertically and laterally from the load beam centerline a controlled amount to have a predetermined clearance above the disk for optimum insertion of the lifting cam, the clearance being adjustable by variation of the angle and length of the lift arm supporting web. It is a further object to provide a lifter structure that is readily manufactured by conventional techniques, achieving its positioning by a series of linear shifts rather than compound and complex curvatures.

These and other objects of the invention to become apparent hereinafter, are realized in a front end-liftable disk drive suspension load beam adapted for carrying a flexure supporting a slider in operating proximity to a disk, the load beam having a distal end comprising a rigid portion extended in a plane along a longitudinal axis for attachment of the flexure, a lift arm attached to the load beam rigid portion by a web, the web being so dimensioned and angled relative to the load beam rigid portion plane as to attach the lift arm spaced from the load beam rigid portion in rigid portion centerline laterally and vertically offset relation.

In this and like embodiments, typically, the lift arm is extended along a longitudinal axis, the lift arm longitudinal axis being generally parallel with the load beam rigid portion longitudinal axis, the angle of the web to the rigid portion plane is between 1 and 90° C., the web comprises a longitudinally extended member fixed at one end to the rigid portion and carrying the lifter arm at its opposite end, the web being reversely turned adjacent the lifter arm, or the web comprises a longitudinally extended member fixed at one end to the rigid portion and carrying the lifter arm at its opposite end, the web being reversely turned adjacent the lifter arm, the web being integral with the lifter arm and separate from the load beam rigid portion, or the web comprises an axially elongated member separately formed from the rigid portion, the web having a base parallel to the rigid portion, an angled portion extending from the base at an angle thereto, a reversely turned portion having an inner edge attached to the angled portion and an outer edge generally parallel to the rigid portion longitudinal axis, a trough between the inner and outer edges, and a terminal portion defining the lifter arm, the lifter arm being generally parallel with the rigid portion longitudinal axis.

In a further embodiment, the invention comprises a front end-liftable disk drive suspension load beam adapted for carrying a flexure supporting a slider in operating proximity to a disk, the load beam having a distal end comprising a rigid portion extended in a plane along a longitudinal axis for attachment of the flexure, a lift arm attached to the load beam rigid portion by a web, the web comprising an axially elongated member separately formed from the rigid portion, the web having a base parallel to the rigid portion, an angled portion extending from the base at an angle thereto between 1 and 90° C., a reversely turned portion having an inner edge attached to the angled portion and an outer edge generally parallel to the rigid portion longitudinal axis, a trough between the inner and outer edges, and a terminal portion defining the lifter arm, the lifter arm being generally parallel with the rigid portion longitudinal axis whereby the lift arm is spaced from the load beam rigid portion in rigid portion centerline laterally and vertically offset relation.

In a particularly preferred embodiment, the invention comprises a front end-liftable disk drive suspension load beam having a lifter arm vertically and laterally offset from the load beam centerline, the load beam comprising an elongated member having on a centerline a load beam rigid portion adapted for carrying a slider in operating proximity to a disk, the load beam extending in a plane including the centerline; a lifter structure comprising an elongated lifter arm offset from the load beam centerline and spaced from the load beam a predetermined height, the lifter arm being adapted to engage a lift cam in load beam separating relation from the disk, and a web bracket extending between the load beam and the lifter element, the having a given length greater than the predetermined height, the lifter bracket extending from the load beam at a predetermined angle, the web having a proximate end attached to the load beam rigid portion at the angle, a reversely turned web portion outward of the web proximate end that reduces the effective length of the web to equal the predetermined height, and a distal end terminating the reversely turned portion and attached to the lifter arm, whereby the lifter element is supported at the terminus of the web reversely turned portion to be spaced from the load beam a distance less than the web given length and in offset relation to the load beam centerline.

In this and like embodiments, typically, the web has a width extending in the direction of the load beam elongation that is less than the longitudinal extent of the load beam rigid portion, the lifter structure is elongated and extends beyond the load beam in web-cantilevered relation, the lifter structure is longitudinally dished in stiffening relation, the web predetermined angle is between 1 and 90° C. degrees to the load beam plane, the web reverse turned portion comprises parallel web portions, the location of the lifter structure relative to the load beam is variable in manufacturing by varying in concert the predetermined angle of the lifter bracket web to the load beam plane and the reversely turned web portion to obtain the desired location, the lift bracket web has a width extending in the direction of the load beam elongation that is less than the longitudinal extent of the load beam rigid portion, the lifter structure is elongated and extends beyond the load beam in web-cantilevered relation, and/or the lifter structure is longitudinally dished to have an upwardly open-shaped cross-section in lifter structure stiffening relation.

BRIEF DESCRIPTION OF THE DRAWINGS

The invention will be further described in conjunction with the attached drawings, in which:

FIG. 2 is a plan view thereof;

FIG. 3 is a side elevation view thereof;

DETAILED DESCRIPTION

Prior lifters are disadvantageous in several ways. Most of them are glued using adhesives or epoxies, which is labor intensive, difficult and costly. Some of the lifters require an off track pick up point. To manufacture a lifter with curved contour and compound angle is very difficult. It involves complex tooling and cumulative and variable tolerances. This invention, however, takes the complex curved shapes and converts it to linear shifts along the x-y and z directions. This design of off track centerline lifter is easily manufacturable.

The invention lifter allows the lifter lift point to be off-axis from the centerline of the suspension by x, y and/or z using tailored forming steps. The forming steps include bending the lifter in a straight line and at an angle so that the lifter is linearly shifted to a desired location. For example, a lifter is formed at an angle of 78 deg (angle can be formed from 1 to 90° C. as required), about the long axis of the suspension and then folded back in the reversed direction after it meets the height requirement and then formed to have a "u or v" shape channel to stiffen the lift rod. The forming steps, being simple make manufacturing easier and improve the tolerance of the lift point. Most of the lifter location can be achieved by adjusting the forming angle and length of the lifter.

Figure 4:
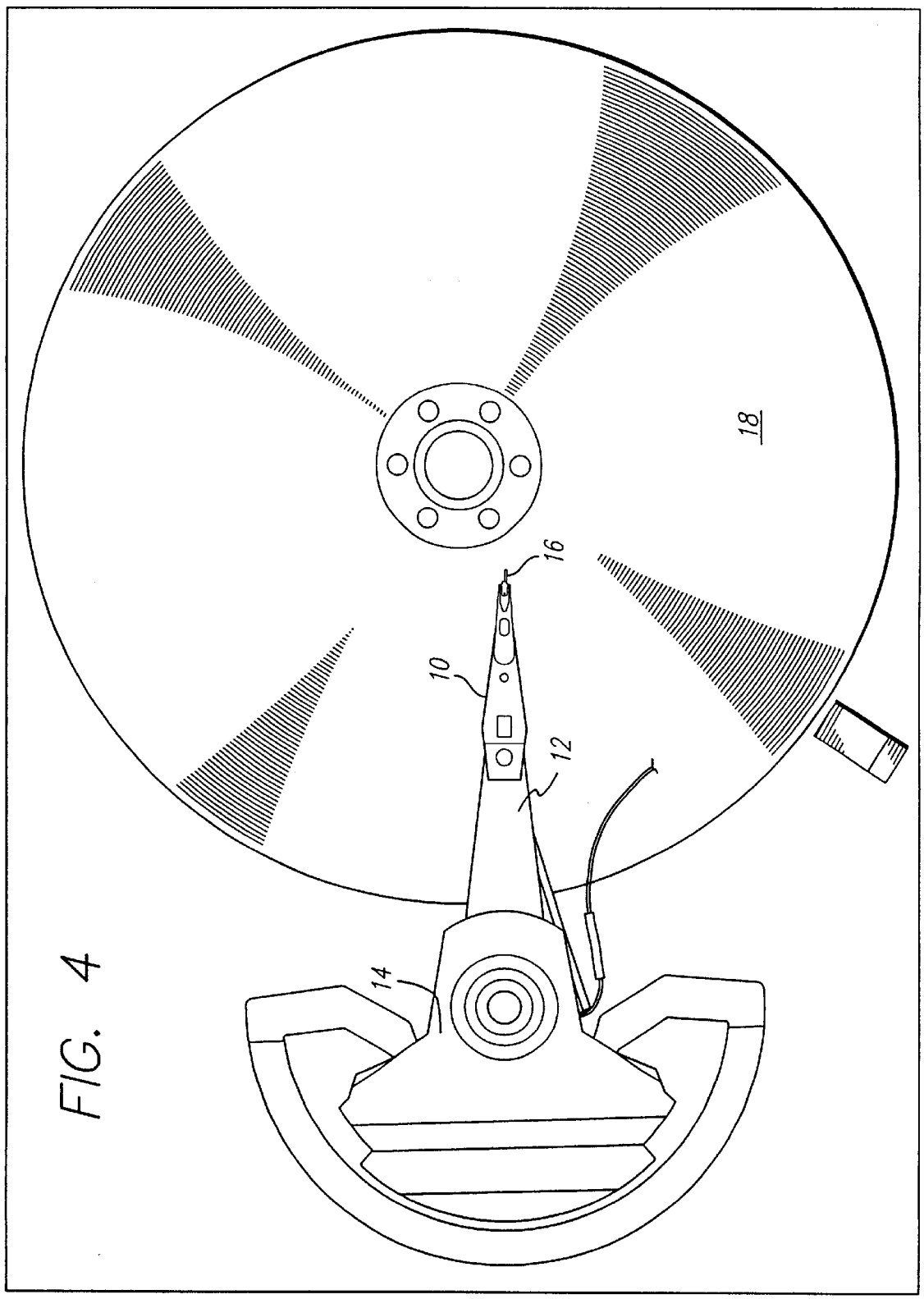
FIG. 4 is a plan view of the invention mounted on an actuator arm above a disk.

With reference now to the drawings in detail, in FIG. 4 the load beam 10 is shown conventionally mounted on an actuator arm 12 mounted to an actuator 14 and carrying a slider 16 in operating proximity to the disk 18.

Figures 1, 5:
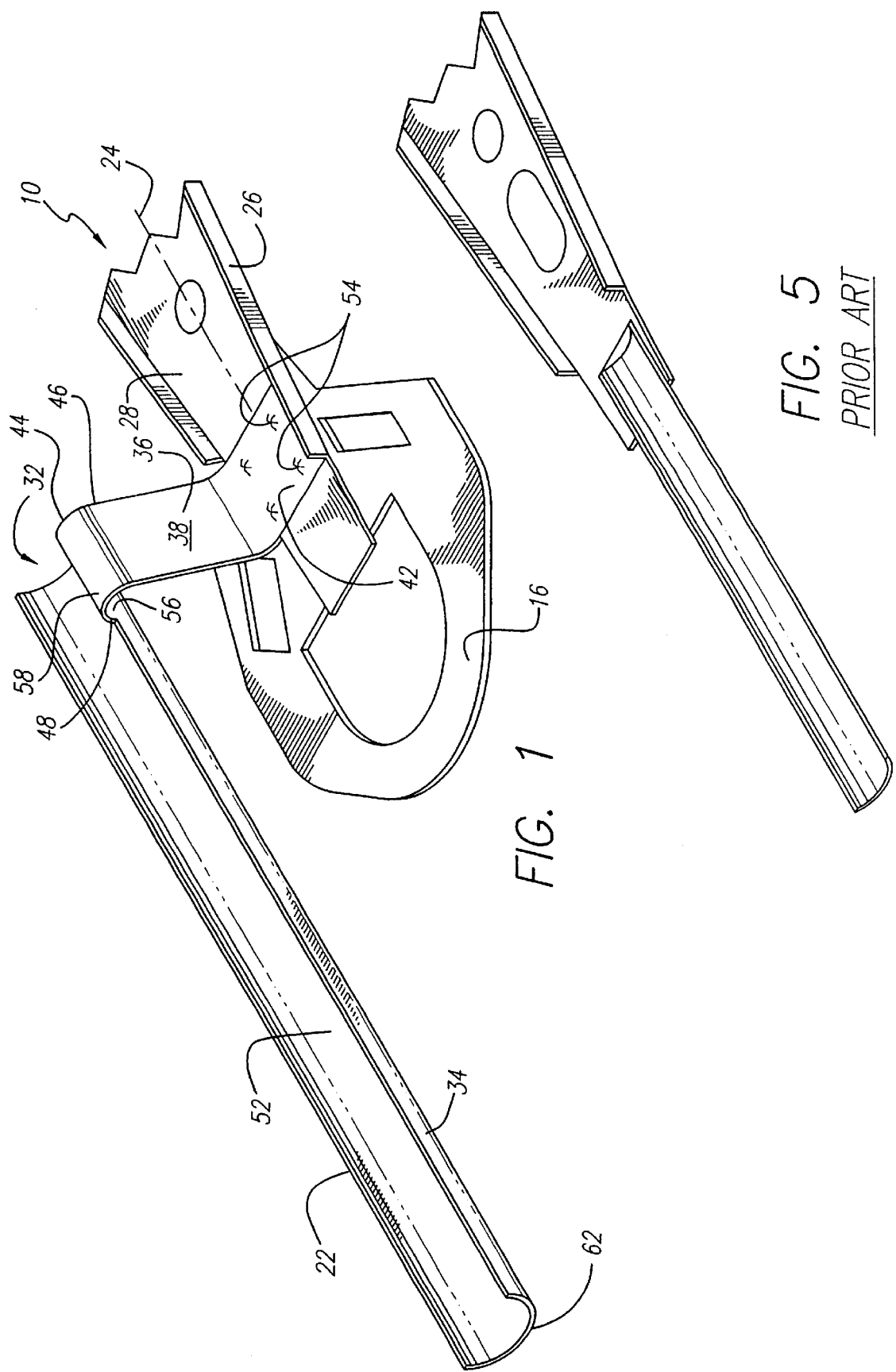
FIG. 1 is an oblique view of the invention load beam with the vertically and laterally offset lifter arm feature shown.
FIG. 5 is a PRIOR ART load beam and lifter.

With reference to FIGS. 1–3, invention load beam 10 is a front end-liftable load beam having a lifter arm 22 vertically and laterally offset from the load beam centerline 24. The load beam 10 comprises an elongated member 26 having on its centerline 24 a load beam rigid portion 28 adapted for carrying the slider 16 in operating proximity to the disk 18 (FIG. 4). The load beam 10 extends in a plane including the centerline 24. A lifter structure 32 is provided comprising an elongated lifter arm 34 offset from the load beam centerline 24 and spaced from the load beam 10 a predetermined height. The lifter arm 34 is adapted to engage a lift cam (conventional and not shown) in load beam 10 separating relation from the disk 18. The lifter structure 32 further comprises a web 36 defining a bracket 38 and extending between the load beam 10 and the lifter arm 22, the web having a given length greater than the predetermined height. The web 36 lifter bracket 38 extends from the load beam 10 at a predetermined angle such as 1 to 90° C. The web 36 has a proximate end 42 attached to the load beam rigid portion 28 at the noted angle. The web 36 further has a reversely turned web portion 44 outward of the web proximate end 42 that reduces the effective length of the web to equal the predetermined height, and a distal end 46 terminating the reversely turned portion and attached to the lifter arm 34. As shown, the lifter arm 36 is supported at the terminus 48 of the web reversely turned portion 44 to be spaced from the load beam 10 a distance less than the web 36 given length and in offset relation to the load beam centerline 24.

As shown in the drawings, the web 36 has a width extending in the direction of the load beam 10 elongation that is less than the longitudinal extent of the load beam rigid portion 28. The lifter structure 32 is elongated and extends beyond the load beam 10 in web-cantilevered relation. Further, the lifter structure 32 in the preferred embodiment illustrated is longitudinally dished to form trough 52 in lifter arm 34 stiffening relation. A V-shaped, polygonal or U-shaped trough 52 can be used.

The invention lifter structure can be formed integrally with the load beam as a unitary piece, or as shown is formed separately from the load beam and weld-attached as at 54. The web 36 predetermined angle is between 1 and 90° C. degrees to the load beam 10 plane. The web reverse turned portion 44 comprises parallel web portions 56, 58. The location of the lifter structure 32 relative to the load beam 10 is variable in manufacturing by varying in concert the predetermined angle of the web 36 to the load beam 10 plane and the reversely turned web portion 44 to obtain the desired location. In a preferred form, the web 36 has a width extending in the direction of the load beam elongation that is less than the longitudinal extent of the load beam rigid portion 28, the lifter structure 32 is elongated and extends beyond the load beam 10 in web-cantilevered relation, and the lifter structure 32 is longitudinally dished to have an upwardly open-shaped cross-section trough 52 to stiffen the structure and provide a smooth undersurface 62 for engaging the lifting cam.

The invention thus provides a load beam having a lifter structure comprising a lift arm offset vertically and laterally from the load beam centerline a controlled amount to have a predetermined clearance above the disk for optimum insertion of the lifting cam, the clearance being adjustable by variation of the angle and length of the lift arm supporting web. The lifter structure is readily manufactured by conventional techniques, achieving its positioning by a series of linear shifts rather than compound and complex curvatures.

The foregoing objects are thus met.

We claim:

1. A front end-liftable disk drive suspension load beam adapted for carrying a flexure supporting a slider in operating proximity to a disk, the load beam having a distal end comprising a rigid portion extended in a plane along a longitudinal axis for attachment of said flexure, a web extending laterally from said rigid portion, a lift arm extending forwardly of said load beam distal end and attached to said load beam rigid portion by said web, said lift arm being spaced from said load beam rigid portion and vertically offset therefrom.

2. The front end-liftable disk drive suspension load beam according to claim 1, in which said lift arm is extended along a longitudinal axis, said lift arm longitudinal axis being generally parallel with said load beam rigid portion longitudinal axis.

3. The front end-liftable disk drive suspension according to claim 1, in which the angle of said web to said rigid portion plane is between 1 and 90° C.

4. The front end-liftable disk drive suspension according to claim 1, in which said web comprises a longitudinally extended member fixed at one end to said rigid portion and carrying said lifter arm at its opposite end, said web being reversely turned adjacent said lifter arm.

5. The front end-liftable disk drive suspension according to claim 1, in which said web comprises a longitudinally extended member fixed at one end to said rigid portion and carrying said lifter arm at its opposite end, said web being reversely turned adjacent said lifter arm, said web being integral with said lifter arm and separate from said load beam rigid portion.

6. The front end-liftable disk drive suspension according to claim 1, in which said web comprises an axially elongated member separately formed from said rigid portion, said lifter arm being generally parallel with said rigid portion longitudinal axis.

7. A front end-liftable disk drive suspension load beam adapted for carrying a flexure supporting a slider in operating proximity to a disk, said load beam having a distal end comprising a rigid portion having left and right sides and extended in a plane along a longitudinal axis for attachment of said flexure, a web, a lift arm extending forwardly of said distal end and attached to said load beam rigid portion by said web, said web having a base parallel to said rigid portion, said web base being attached to said left or right side of said rigid portion, an angled portion extending laterally of said distal end and from said base at an angle thereto, and a terminal portion defining said lifter arm, said lifter arm being generally parallel with said rigid portion longitudinal axis and vertically offset from said rigid portion.

8. A front end-liftable disk drive suspension load beam having a lifter arm vertically offset from the load beam centerline, said load beam comprising an elongated member having on said centerline a load beam rigid portion adapted for carrying a slider in operating proximity to a disk, said load beam having left and right sides and extending in a plane including said centerline; a lifter structure comprising an elongated lifter arm extending forwardly of said load beam and offset from said load beam centerline and spaced from said load beam a predetermined height, said lifter arm being adapted to engage a lift cam in load beam separating relation from said disk, and a web bracket extending laterally of said load beam and between said load beam and said lifter element at a predetermined angle, said web bracket having a proximate end attached to said left or right side of said load beam rigid portion at said angle, and a distal end attached to said lifter arm, whereby said lifter element is supported at the terminus of said web to be spaced from said load beam in offset relation to said load beam centerline.

9. The front end-loadable disk drive suspension load beam according to claim 8, in which said web has a width extending in the direction of said load beam elongation that is less than the longitudinal extent of said side of said load beam rigid portion.

10. The front-end-loadable disk drive suspension load beam according to claim 9, in which said lifter structure is elongated and has a distal portion that extends beyond said load beam in web-cantilevered relation.

11. The front end-loadable disk drive suspension load beam according to claim 10, in which said lifter structure is longitudinally dished in stiffening relation.

12. The front end-loadable disk drive suspension load beam according to claim 11, in which said web predetermined angle is between 1 and 90° C. degrees to said load beam plane.

13. The front end-loadable disk drive suspension load beam according to claim 12, in which said web comprises parallel web portions.

14. The front end-loadable disk drive suspension load beam according to claim 13, in which the location of said lifter structure relative to said load beam is variable in manufacturing by varying in concert said predetermined angle of said lifter bracket web to said load beam plane and said web to obtain the desired location.

15. The front end-loadable disk drive suspension load beam according to claim 14, in which said lift bracket web has a width extending in the direction of said load beam elongation that is less than the longitudinal extent of said side of said load beam rigid portion.

16. The front end-loadable disk drive suspension load beam according to claim 15, in which said lifter structure is elongated and extends beyond said load beam in web-cantilevered relation.

17. The front end-loadable disk drive suspension according to claim 16, in which said lifter structure is longitudinally dished to have an upwardly open-shaped cross-section in lifter structure stiffening relation.

* * * * *